(12) United States Patent
Such

(10) Patent No.: US 6,868,541 B1
(45) Date of Patent: Mar. 15, 2005

(54) ASYNCHRONOUS PROGRAMMING ENVIRONMENT

(75) Inventor: Ondrej Such, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/218,060

(22) Filed: Dec. 21, 1998

(51) Int. Cl.[7] .............................................. G06F 9/46
(52) U.S. Cl. ...................................... 719/316; 718/104
(58) Field of Search ................................ 719/316, 328, 719/331–332; 718/104; 709/310–332; 717/108

(56) References Cited

U.S. PATENT DOCUMENTS

| | | | | |
|---|---|---|---|---|
| 5,392,433 A | * | 2/1995 | Hammersley et al. | 710/200 |
| 5,414,841 A | * | 5/1995 | Bingham et al. | 707/100 |
| 5,485,626 A | * | 1/1996 | Lawlor et al. | 709/315 |
| 5,619,710 A | * | 4/1997 | Travis, Jr. et al. | 709/203 |
| 5,734,903 A | * | 3/1998 | Saulpaugh et al. | 709/316 |
| 5,737,611 A | * | 4/1998 | Vicik | 710/200 |
| 5,764,958 A | * | 6/1998 | Coskun | 717/108 |
| 5,867,708 A | * | 2/1999 | Copeland et al. | 709/315 |
| 6,119,173 A | * | 9/2000 | Pullen et al. | 709/328 |
| 6,122,631 A | * | 9/2000 | Berbec et al. | 707/9 |
| 6,557,165 B1 | * | 4/2003 | Nagashima et al. | 717/108 |

OTHER PUBLICATIONS

Appel, A.W., "Testing Class Membership", In: *Modern Compiler Implementation in ML,* Cambridge University Press, 300–304, (1998).

* cited by examiner

Primary Examiner—St. John Courtenay, III
Assistant Examiner—Charles E. Anya
(74) Attorney, Agent, or Firm—Christensen O'Connor Johnson Kindness PLLC

(57) ABSTRACT

An asynchronous programming environment is disclosed. In one embodiment, the environment comprises a dynamic object storage scheme, a dynamic dispatch scheme, and an object recognition scheme. The dynamic object storage scheme stores a plurality of objects. The dynamic dispatch scheme is presence one of a certain number objects. The object recognition scheme describes the plurality of objects.

15 Claims, 3 Drawing Sheets

ASYNCHRONOUS PROGRAMMING ENVIRONMENT

CROSS-REFERENCES TO RELATED APPLICATIONS

The present application incorporates by reference the coassigned and copending U.S. application Ser. No. 09/217,389, filed Dec. 21, 1998, entitled "A Recyclable Locking for Multi-Threaded Computing Environments," and U.S. application Ser. No. 09/217,402, filed Dec. 21, 1998, entitled "A Token-Based Object Description."

FIELD

This invention relates generally to programming environments and more particularly to such environments that are asynchronous.

BACKGROUND

Programming environments are the environments in which computer programs are developed and executed. Different types of environments provide for different advantages and disadvantages in the development of bug-free computer programs. As computer programs have become increasingly complex, programming environments have been examined as a factor that may strongly affect the length of time it takes to create computer programs, and the number of bugs that may be within such programs as they are executed in conjunction with other computer programs.

In perhaps the most traditional type of programming environment, computer programs are written in a procedural manner. That is, generally speaking, a first line of code of the program is executed, followed by a second line, etc., until the program is finished. However, this type of programming environment does not usually lend itself well to the development of highly complex computer programs that must run concurrently with other programs. Such development, for example, may be performed by a relatively large team of programmers, such that each programmer must typically be aware of the manner by which the other programmers are developing their part of the computer program for the computer program to run efficiently and bug-free. This is generally difficult to accomplish in this type of programming environment.

Another programming environment is the message-driven environment, at least partially implemented and popularized by modern operating systems such as current versions of the MICROSOFT WINDOWS operating system. In such environments, different objects interface with other objects via messages, and execution of the procedures are initiated by events. However, these messages are complex structures, such that the context must be unpacked from messages prior to the execution of an action. This fragility may render development of computer programs potentially more difficult and bug-laden than is desired. For these and other reasons, there is a need for the present invention.

SUMMARY

The above-identified problems, shortcomings and disadvantages with the prior art, as well as other problems, shortcoming and disadvantages, are solved by the present invention, which will be understood by reading and studying the specification and the drawings. In one embodiment, an asynchronous programming environment comprises a dynamic object storage scheme, a dynamic dispatch scheme, and an object recognition scheme. The dynamic object storage scheme stores a plurality of objects. The dynamic dispatch scheme is based on events from at least one of the plurality of objects. Finally, the object recognition scheme describes the plurality of objects.

Embodiments of the invention provide for advantages not found in the prior art. For example, in one particular embodiment, the plurality of objects as stored via the dynamic object storage scheme are accessible utilizing a recyclable locking mechanism; the plurality of objects as described via the object recognition scheme each include a series of tokens, where each token relates to an attribute of the object; and, the dynamic dispatch scheme provides for execution of objects based on unpacked-into-messages events.

First, asynchronous programming environment provides for development of thread-agnostic programs. Such programs provide symmetric multithreading, thereby easily scaling to utilize the most of available CPU processing power. In particular, this symmetric multithreading is expected to reduce instruction cache misses on hardware implementations handling multiple instruction streams at once.

Secondly an asynchronous programming environment is more efficient than message driven one: since execution is driven via presence of objects, so that no translation is needed to recover context of execution. Furthermore, the recyclable locking mechanism and the token-based object recognition scheme provide for the locking of objects in an efficient manner and a flat, efficient manner by which to describe (and thus recognize) objects, respectively. With these attributes of the asynchronous programming environment, programs may be developed in a more efficient and more bug-free manner.

The invention includes systems, methods, computers, and computer-readable media of varying scope. Besides the embodiments, advantages and aspects of the invention described here, the invention also includes other embodiments, advantages and aspects, as will become apparent by reading and studying the drawings and the following description.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a system of one embodiment of the invention is presented. In the third section, a method, in accordance with an embodiment of the invention, is provided. Finally, in the fourth section, a conclusion of the detailed description is provided.

Hardware and Operating Environment

Figure 1:
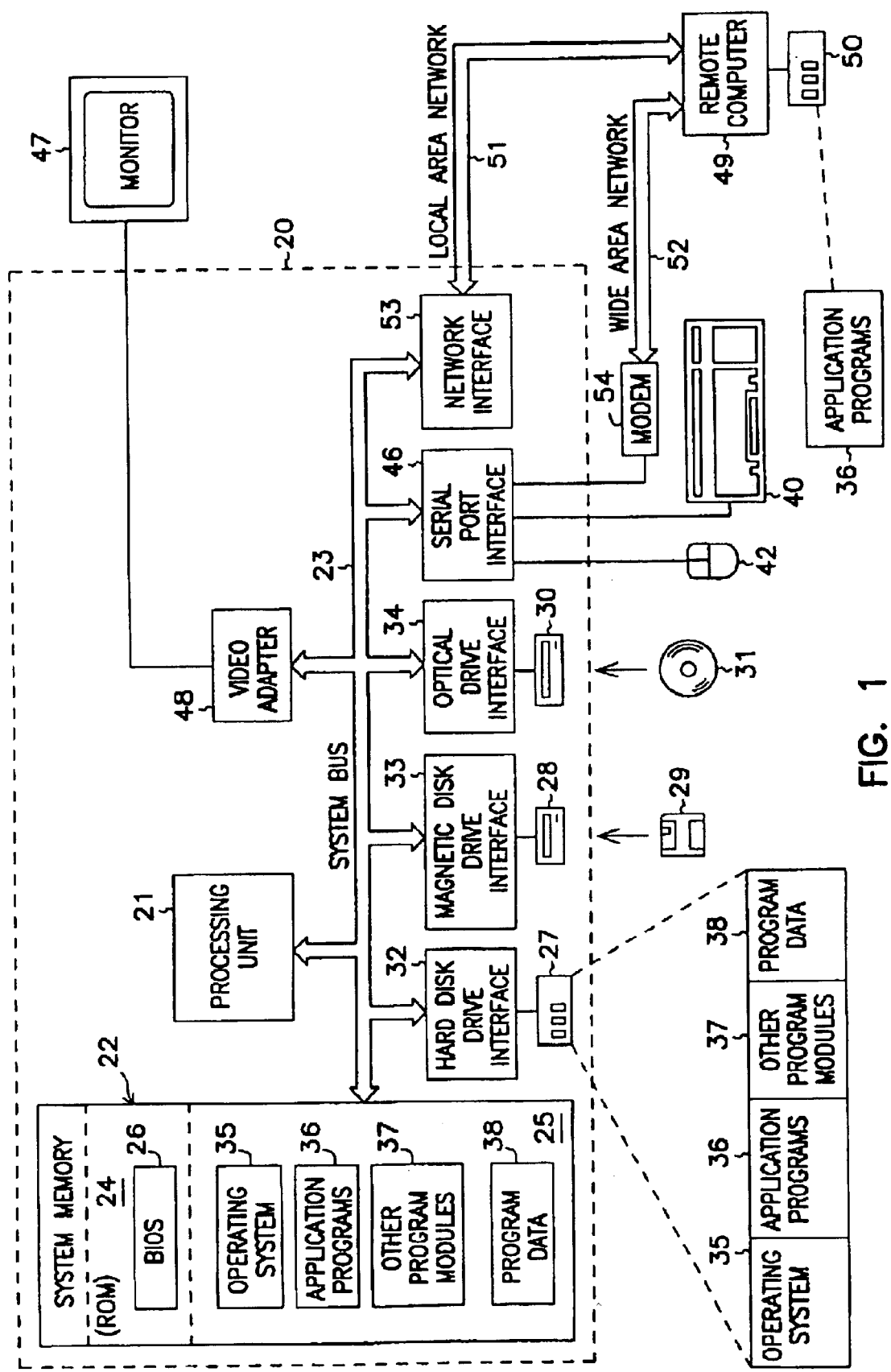
FIG. 1 shows a diagram of the hardware and operating environment in conjunction with which embodiments of the invention may be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System

Figure 2:
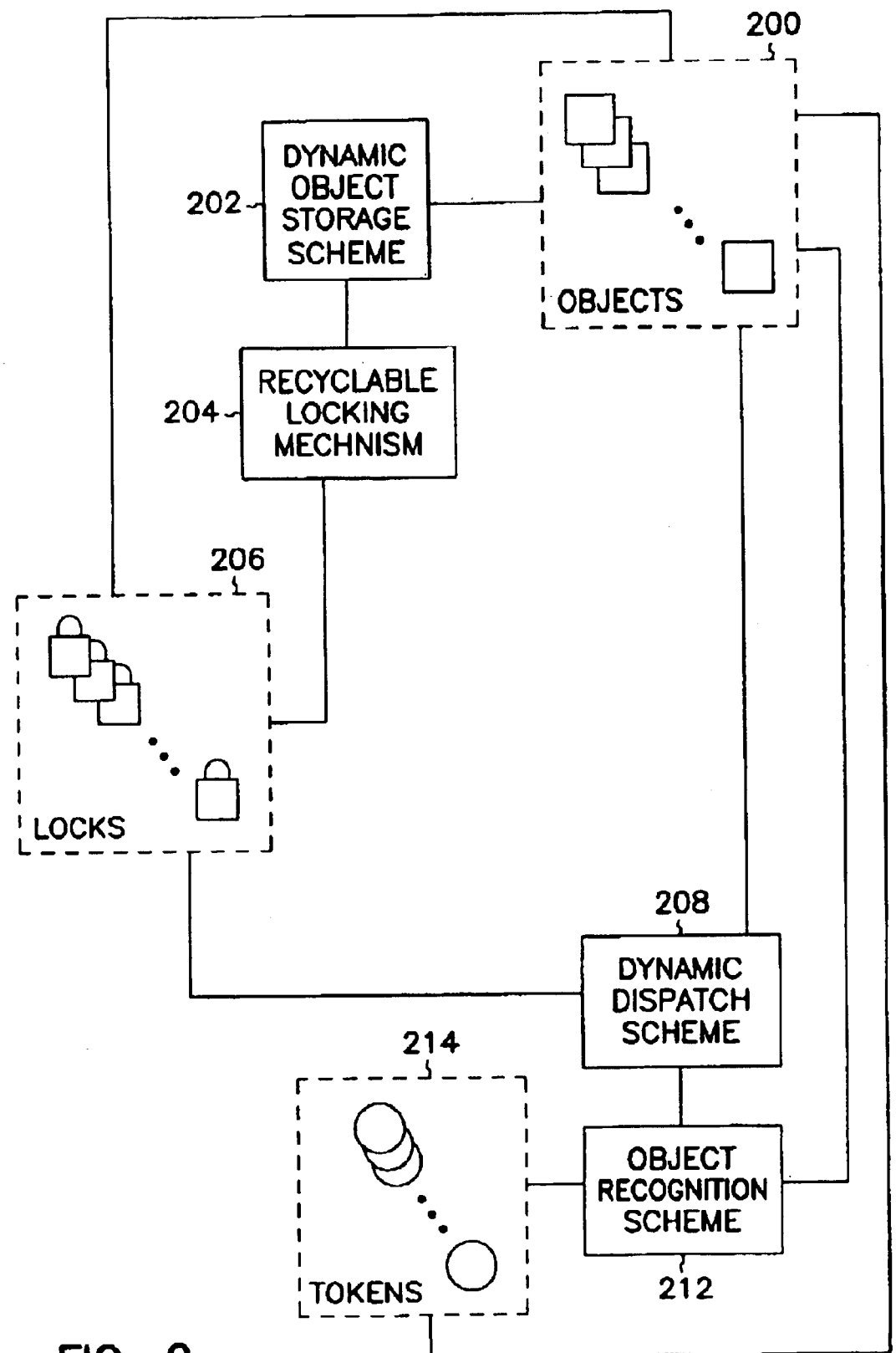
FIG. 2 shows a diagram of a system according to an embodiment of the invention; and, FIG. 3 shows a flowchart illustrating a method according to one embodiment of the invention.

In this section of the detailed description, a description of a computerized system according to an embodiment of the invention is provided. The description is provided by reference to FIG. 2. Referring first to FIG. 2, a diagram of a system according to an embodiment of the invention is shown. The system of FIG. 2 includes a plurality of objects 200, a dynamic object storage scheme 202, a recyclable locking mechanism 204, a plurality of lock objects 206, a dynamic dispatch scheme 208, an object recognition scheme 212, and a plurality of tokens 214.

Each of the objects 200 represents a (not necessarily contiguous) memory segment storing data or instructions, as known within the art. The invention is not limited to a particular number of type of objects 200. Representative types of objects that can be used with different embodiments of the invention include Java objects, C++ objects, and Component Object Model (COM) objects, all of which are also known within the art.

The dynamic object storage scheme 200 stores the plurality of objects 200 so that they may be accessed as necessary by different threads within the asynchronous programming environment. The object storage scheme is dynamic in that objects may be created and removed as necessary during the execution of tasks within the asynchronous programming environment. Such schemes are known within the art. In one embodiment, the plurality of objects 200 can be locked in accordance with a recyclable locking mechanism 204, as is described in the copending and coassigned U.S. application Ser. No. 09/217,389, filed Dec. 21, 1998, entitled "A Recyclable Locking for Multi-Threaded Computing Environments," which has already been incorporated by reference. The mechanism uses the plurality of lock objects 206 to accomplish the locking of the objects 200 for exclusive or non-exclusive access by threads, as that term is known within the art.

The dynamic dispatch scheme 208 is based on plularity of objects 200. An action that may be invoked by a dynamic dispatch scheme 208 may fall into (at different times perhaps different) 3 categories—needing precisely one object, needing more than one object, or not needing an object at all. Those needing precisely one object may be understood as message handlers (or Microsoft Windows™ Windows Procedures), and dynamic dispatch schemes using only such actions have been commercially introduced (e.g. Microsoft Windows). Actions that do not need any objects for their execution can be executed at any time, and are generally used to create objects in the plurality of objects 200. Typical examples include, but are not limited to default constructors for Java and C++ objects, real-time routines, like Internet packet processing, or input from vision or sound devices. Finally, actions that require multiple objects for their dispatch generally combine objects and perform tasks as designed by the programmer. An example is the current implementation of COM runtime services, in which MTS provides object pooling. In this case an action constitutes returning interface pointer when 2 objects are present—an object in object pool of MTS, and a request of a client for such an object. Actions that require multiple objects necessitate the presence of an object locking scheme as a service provided by the programming environment whenever multiple threads of execution are involved. This is because demanding exclusive access to multiple objects may result in a deadlock of threads. Shifting locking mechanism inside the dispatching scheme allows prevention of deadlocks.

Finally, the object recognition scheme 212 provides for the description of the plurality of objects. The description of objects is necessary so that functions such as application, programming interfaces (APIs) are able to determine whether a given object fits a given API. Such descriptions may include, for example, a hierarchical tree structure of object types, as known within the art, which require traversal to determine the description of a given object. However, in one embodiment, the scheme 212 utilizes a plurality of tokens 214, such that each object within the plurality of objects 200 is describable with a sequence of tokens, where each token relates to an attribute of the object, such as object type. Such token-based description is pursuant to description provided in the copending and coassigned U.S. application Ser. No. 09/217,402, filed Dec. 21, 1998, entitled "A Token-Based Object Description," which has already been incorporated by reference.

Embodiments of the invention thus provide a unique asynchronous programming environment having a dynamic object storage scheme, a dynamic dispatch scheme, and an object recognition scheme. In one embodiment, the environment is provided such that the storage scheme and the recognition scheme are pursuant to patent applications previously incorporated by reference. In another embodiment, the environment is pursuant to the reference Ondrej Such, AApplications of Stochastic Asynchronous Programming Technique to Procedure Testing,= May 1998, which is hereby incorporated by reference.

Method

In this section of the detailed description, a method according to an embodiment of the invention is presented. This description is provided in reference to FIG. 3. The computerized method is desirably realized at least in part as one or more programs running on a computer—that is, as a program executed from a computer-readable medium such as a memory by a processor of a computer. The programs are desirably storable on a computer-readable medium such as a floppy disk or a CD-ROM, for distribution and installation and execution on another (suitably equipped) computer.

Thus, in one embodiment, a computer program is executed by a processor of a computer from a medium therefrom to provide an asynchronous programming environment having a dynamic object storage scheme, a dynamic dispatch scheme, and an object recognition scheme. The dynamic object storage scheme stores a plurality of object. The dynamic dispatch scheme is based on events from at least one of the plurality of objects. The object recognition scheme describes the plurality of objects.

Figure 3:
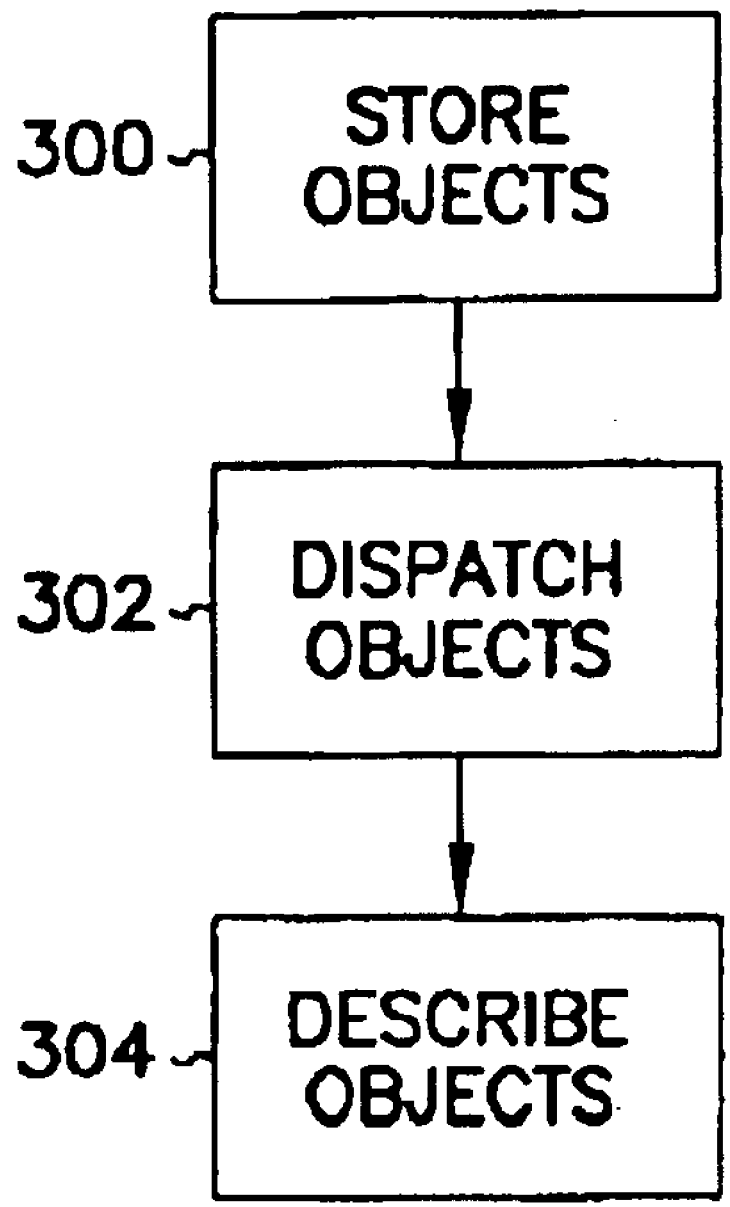

Referring now to FIG. 3, a flowchart of a method according to one embodiment of the invention is shown. In 300, a plurality of objects is stored via a dynamic object storage scheme, for example, as has been described in the previous section of the detailed description. In one embodiment, such storage is accomplished such that the objects are accessed utilizing a recyclable locking mechanism as described in the copending and coassigned U.S. application Ser. No. 09/217, 389, filed Dec. 21, 1998, entitled "A Recyclable Locking for Multi-Threaded Computing Environments," which has previously been incorporated by reference.

In 302, at least one of the plurality of objects are dispatched (that is, execution thereof is initiated), based on events from at least one of the plurality of objects, for example, as has been described in the previous section of the detailed description. In one embodiment, such dispatch is accomplished by executing one or more objects based on unpacked-into-messages events, as opposed to events that are packed into messages. This provides for a less fragile asynchronous programming environment.

In 304, finally, each of the plurality of objects is described utilizing an object recognition scheme, as has been described in the previous section of the detailed description. Such description provides for the testing of the objects against functions such as application programming interfaces (APIs), so that it can be determined efficiently whether a given object can be executed against a given API. In one embodiment, the object recognition scheme includes describing each of the objects as a series of tokens, where each token relates to an attribute of the object (for example, the type of the object), pursuant to the copending and coassigned U.S. application Ser. No. 09/217,402, filed Dec. 21, 1998, entitled "A Token-Based Object Description," which has already been incorporated herein by reference.

CONCLUSION

An asynchronous programming environment has been described. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

What is claimed is:

1. An asynchronous programming environment, comprising:
   a dynamic object storage scheme for storing a plurality of objects;
   a dynamic dispatch scheme for invoking an action that belongs to one of a plurality of categories, the plurality of categories including needing one object, needing more than one object, and needing no object, the dynamic dispatch scheme providing for execution of objects based on unpacked-into-messages events; and
   an object recognition scheme for providing a description of each object of the plurality of objects, the description allowing a determination of whether an object described by the description fits an application programming interface.

2. The environment of claim 1, wherein the plurality of objects as stored via the dynamic object storage scheme are accessible utilizing a recyclable locking mechanism.

3. The environment of claim 1, wherein the plurality of objects as described via the object recognition scheme each comprise a series of tokens, each token relating to an attribute of the object.

4. A method comprising:
   storing a plurality of objects via a dynamic object storage scheme;
   dispatching at least one of the plurality of objects via a dynamic dispatch scheme based on events from at least one of the plurality of objects, the dynamic dispatch scheme capable of invoking an action that belongs to one of a plurality of categories, the plurality of categories including needing one object, needing more than one object, and needing no object, the act of dispatching executing at least one of the plurality of objects based on unpacked-into-messages events; and
   describing each of the plurality of objects utilizing an object recognition scheme, the object recognition scheme providing a description of each object of the plurality of objects, the description allowing a determination of whether an object described by the description fits an application programming interface.

5. The method of claim 4, wherein storing a plurality of objects via a dynamic object storage scheme comprises accessing one of the plurality of objects utilizing a recyclable locking mechanism.

6. The method of claim 4, wherein describing each of the plurality of objects utilizing an object recognition scheme comprises describing each of the plurality of objects as a series of tokens, each token relating to an attribute of the object.

7. A computer comprising:
   a processor;
   a computer-readable medium; and
   an asynchronous programming environment executed by the processor from the computer-readable medium, the environment comprising:
   a dynamic object storage scheme for storing a plurality of objects;
   a dynamic dispatch scheme based on events from at least one of the plurality of objects, for invoking an action that belongs to one of a plurality of categories, the plurality of categories including needing one object, needing more than one object, and needing no object, the dynamic dispatch scheme providing for execution of objects based on unpacked-into-messages events; and
   an object recognition scheme, for providing a description of each object of the plurality of objects, the description allowing a determination of whether an object described by the description fits an application programming interface.

8. The computer of claim 7, wherein the plurality of objects as stored via the dynamic object storage scheme are accessible utilizing a recyclable locking mechanism.

9. The computer of claim 7, wherein the plurality of objects as described via the object: recognition scheme each comprise a series of tokens, each token relating to an attribute of the object.

10. The computer of claim 7, wherein the computer-readable medium comprises a memory.

11. A computer-readable medium having a computer program stored thereon for execution on a computer, the computer program providing an asynchronous programming environment comprising:
    a dynamic object storage scheme for storing a plurality of objects;
    a dynamic dispatch scheme based on events from at least one of the plurality of objects for invoking an action that belongs to one of a plurality of categories, the plurality of categories including needing one object, needing more than one object, and needing no object, the dynamic dispatch scheme providing for execution of objects based on unpacked-into-messages events; and
    an object recognition scheme for providing a description of each object of the plurality of objects, the description allowing a determination of whether an object described by the description fits an application programming interface.

12. The computer-readable medium of claim 11, wherein the plurality of objects as stored via the dynamic object storage scheme are accessible utilizing a recyclable locking mechanism.

13. The computer-readable medium of claim 11, wherein the plurality of objects as described via the object recognition scheme each comprise a series of tokens, each token relating to an attribute of the object.

14. The computer-readable medium of claim 11, wherein the computer-readable medium comprises a compact disc read only memory (CD-ROM).

15. The computer-readable medium of claim 11, wherein the computer-readable medium comprises a floppy disk.

* * * * *